United States Patent
Nagarajan et al.

(10) Patent No.: US 9,038,483 B2
(45) Date of Patent: May 26, 2015

(54) WIRELESS PASSIVE RADIO-FREQUENCY STRAIN AND DISPLACEMENT SENSORS

(75) Inventors: Ramaswamy Nagarajan, Westford, MA (US); Jungrae Park, Andover, MA (US); Sharavanan Balasubramaniam, Lowell, MA (US); Mario J. Cazeca, Hudson, NH (US); Shivshankar Sivasubramanian, Lowell, MA (US); Joey Mead, Carlisle, MA (US); Julie Chen, Wilmington, MA (US)

(73) Assignee: University of Massachusetts, Boston, MA (US)

( * ) Notice: Subject to any disclaimer, the term of this patent is extended or adjusted under 35 U.S.C. 154(b) by 484 days.

(21) Appl. No.: 13/394,490

(22) PCT Filed: Sep. 7, 2010

(86) PCT No.: PCT/US2010/047977

§ 371 (c)(1),
(2), (4) Date: Aug. 16, 2012

(87) PCT Pub. No.: WO2011/066028

PCT Pub. Date: Jun. 3, 2011

(65) Prior Publication Data

US 2012/0297888 A1 Nov. 29, 2012

Related U.S. Application Data

(60) Provisional application No. 61/240,430, filed on Sep. 8, 2009.

(51) Int. Cl.
*G01D 7/00* (2006.01)
*G01B 7/14* (2006.01)
(Continued)

(52) U.S. Cl.
CPC ............ *G01L 1/14* (2013.01); *Y10T 29/49103* (2015.01); *G01L 9/007* (2013.01); *G01L 9/0072* (2013.01);
(Continued)

(58) Field of Classification Search
CPC ..... G01L 9/0072; G01L 9/007; G01L 9/0075; G01L 9/14

USPC ............ 73/718, 722, 774, 862.041–862.046, 73/780, 779; 324/207.15, 207.16, 635, 324/652, 655

See application file for complete search history.

(56) References Cited

U.S. PATENT DOCUMENTS

| 3,962,143 A | 6/1976 | Hitch et al. |
| 4,328,441 A | 5/1982 | Kroeger, Jr. et al. |

(Continued)

FOREIGN PATENT DOCUMENTS

| GB | 2 374 424 | 10/2002 |
| JP | 02297993 | 12/1990 |

(Continued)

OTHER PUBLICATIONS

International Search Report and Written Opinion of PCT/US2010/047977 dated Aug. 9, 2011.

(Continued)

*Primary Examiner* — Lisa Caputo
*Assistant Examiner* — Jonathan Dunlap
(74) *Attorney, Agent, or Firm* — Hamilton, Brook, Smith & Reynolds, P.C.

(57) ABSTRACT

Wireless strain and displacement sensors wirelessly monitor structural health and integrity, and are made by printing inductor-interdigital capacitor sensing circuits on a variety of substrates, including ceramic substrates, with thermally processable conductive inks. Sensors of the invention can be employed to detect strain and displacement of civil structures, such as bridges and buildings. The sensors include sensing elements that are mounted or printed on stiff, inflexible substrates, which prevent the sensing elements from bending, stretching, or otherwise warping when the sensor is strained. An interlayer between the sensing elements allows the sensing elements to move with respect to each other during application of strain. Thus, strain causes the sensing elements to move but not to deform, causing changes in sensor resonance that can be detected through wireless radio-frequency interrogation. Because the sensing elements do not change shape when under strain, the sensor can undergo millions of measurement cycles before breaking.

26 Claims, 9 Drawing Sheets

(51) Int. Cl.
*G01R 27/04* (2006.01)
*G01L 1/14* (2006.01)
*G01B 7/16* (2006.01)
*G01B 15/06* (2006.01)
*G01D 21/00* (2006.01)
*G01M 5/00* (2006.01)
*G01L 9/00* (2006.01)

(52) U.S. Cl.
CPC .............. *G01L 9/0075* (2013.01); *G01B 7/16* (2013.01); *G01B 15/06* (2013.01); *G01D 21/00* (2013.01); *G01M 5/0041* (2013.01); *G01M 5/0083* (2013.01); *G01M 5/0091* (2013.01)

(56) References Cited

U.S. PATENT DOCUMENTS

| | | | |
|---|---|---|---|
| 4,369,269 | A | 1/1983 | Harper et al. |
| 4,402,338 | A | 9/1983 | Moller |
| 5,389,403 | A | 2/1995 | Buckley et al. |
| 5,798,462 | A | 8/1998 | Breifer et al. |
| 6,025,725 | A | 2/2000 | Gershenfeld et al. |
| 6,036,889 | A | 3/2000 | Kydd |
| 6,151,967 | A * | 11/2000 | McIntosh et al. ......... 73/514.32 |
| 6,278,379 | B1 * | 8/2001 | Allen et al. ............. 340/870.16 |
| 6,973,838 | B2 | 12/2005 | Denis |
| 7,435,361 | B2 | 10/2008 | Carroll et al. |
| 7,498,802 | B2 * | 3/2009 | Takahata ................. 324/207.15 |
| 8,026,729 | B2 * | 9/2011 | Kroh et al. .................... 324/633 |
| 2003/0148024 | A1 | 8/2003 | Kodas et al. |
| 2004/0176623 | A1 | 9/2004 | Son et al. |
| 2005/0119752 | A1 * | 6/2005 | Williams et al. ........... 623/17.16 |
| 2005/0207930 | A1 | 9/2005 | Yamaguchi |
| 2005/0223812 | A1 * | 10/2005 | Denis .............................. 73/799 |
| 2005/0227820 | A1 | 10/2005 | Dyer et al. |
| 2006/0261316 | A1 | 11/2006 | Jun et al. |
| 2007/0074579 | A1 * | 4/2007 | Cook et al. ...................... 73/718 |
| 2008/0218416 | A1 | 9/2008 | Handy et al. |
| 2009/0201043 | A1 | 8/2009 | Kaltalioglu |
| 2009/0278553 | A1 * | 11/2009 | Kroh et al. .................... 324/633 |
| 2010/0189901 | A1 | 7/2010 | Chung et al. |
| 2011/0029084 | A1 * | 2/2011 | Milbocker et al. ......... 623/17.16 |
| 2012/0130687 | A1 * | 5/2012 | Otto et al. ......................... 703/1 |
| 2012/0146671 | A1 * | 6/2012 | Furuta et al. .................. 324/727 |
| 2012/0273263 | A1 * | 11/2012 | Nagarajan et al. ............ 174/257 |

FOREIGN PATENT DOCUMENTS

| | | |
|---|---|---|
| JP | 10074860 | 3/1998 |
| WO | WO 02/097374 | 12/2002 |
| WO | WO 2008/018718 | 2/2008 |
| WO | WO 2009/146089 | 12/2009 |
| WO | WO 2010/065503 | 6/2010 |
| WO | WO 2011/066028 | 6/2011 |

OTHER PUBLICATIONS

International Preliminary Report on Patentability of PCT/US2010/047977 dated Mar. 13, 2012.

PCT/US2009/066197: International Search Report and Written Opinion of the International Searching Authority, "Conductive Formulations for Use in Electrical, Electronic and RF Applications," dated Jun. 24, 2010.

PCT/US2009/066197: Notification Concerning Transmittal of International Preliminary Report on Patentability, "Conductive Formulations for Use in Electrical, Electronic and RF Applications," dated Jun. 16, 2011.

Office Action, U.S. Appl. No. 12/628,566, "Conductive Formulations for Use in Electrical, Electronic and RF Applications," dated Apr. 14, 2014.

Office Action, U.S. Appl. No. 12/628,566, "Conductive Formulations for Use in Electrical, Electronic and RF Applications," dated Mar. 5, 2013.

Office Action, U.S. Appl. No. 12/628,566, "Conductive Formulations for Use in Electrical, Electronic and RF Applications," dated Sep. 13, 2012.

Buffat, P. and Borel, J.P., "Size Effect on the Melting Temperature of Gold Particles," *Phys. Rev. A.*, 13 (6): 2287-2298 (1975).

Curtis, C.J., el al., "Direct-Write Printing of Silver Metallizations on Silicon Solar Cells," *Mat. Res. Soc. Symp. Proc.* 730: 79-84 (2002).

Dearden, A.L., et al. "A Low Curing Temperature Silver Ink for Use in Ink-Jet Printing and Subsequent Production of Conductive Tracks," *Macromol. Rapid Commun.* 26: 315-318 (2005).

Kashiwagi, Y., et al. "Facile Size-Regulated Synthesis of Silver Nanoparticles by Controlled Thermolysis of Silver Alkylcarboxylates in the Presence of Alkylamines with Different Chain Lengths", *J. Colloid & Interface Sci.*, 300(1): 169-175 (2006).

Lu, Chun-An et al., "Characterization of the Low-Curing-Temperature Silver Paste Containing Silver 2-Ethylhexanoate Addition" *Japanese J. of App. Phys.* 46(1): 251-255 (2007).

Nakamoto, M., et al. "A Variety of Silver Nanoparticle Pastes for Fine Electronic Circuit Pattern Formation," *IEEE Polytronic 2007 Conference*: 105-109 (2007).

Teng, K.F. and Vest, R.W., "Liquid Ink Jet Printing with MOD Inks for Hybrid Microcircuits," *IEEE Trans. Components, Hybrids & Manufacturing Tech.* 12(4):545-549 (1987).

* cited by examiner

Patch Probe 302
FIG. 3A
LC Sensing Element 304a
304b
304c
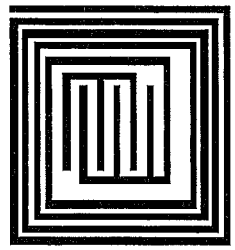
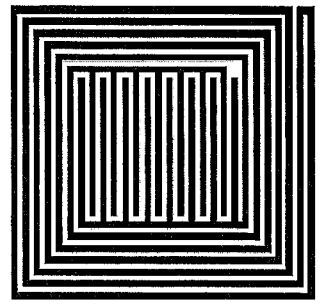
FIG. 3B　　　　FIG. 3C　　　　FIG. 3D

WIRELESS PASSIVE RADIO-FREQUENCY STRAIN AND DISPLACEMENT SENSORS

RELATED APPLICATION

This application is the U.S. National Stage of International Application No. PCT/US2010/047977, filed Sep. 7, 2010, which designates the U.S., published in English, and claims the benefit of U.S. Provisional Application No. 61/240,430, filed Sep. 8, 2009. The entire teachings of which are incorporated herein by reference.

GOVERNMENT SUPPORT

The invention was supported, in whole or in part, by an Award No. W911NF-07-2-0081 from the Army Research Laboratory. The Government has certain rights in the invention.

BACKGROUND OF THE INVENTION

Structural health monitoring to assess the integrity of civil infrastructure, aerospace components, and military aircraft components is critical for the estimation of the optimal service life of these structures and prevention of catastrophic failure. Crack and strain sensing are some of the aspects of structural health monitoring. Catastrophic failure may be caused by strains or displacement beyond allowable (or design permitted) levels, and failure is often preceded by the formation of cracks that are caused by strain.

Strain sensing is one of the most critical aspects of structural health monitoring and non-destructive evaluation. There is a demand for robust strain and displacement sensors that are light-weight, cost-effective, and easy to install. Strain sensors that can measure considerable strains over large areas of structures are needed. Traditional resistive metal foil strain gauge sensors, though low-cost and easy to install, have limitations, such as the need for a physical connection of the sensing element with the interrogation unit. Fiber-optic-based sensors have also received considerable attention since they are very compact and can provide very high resolution. However, they have inherent problems such as fragility and susceptibility to damage. In both these types of strain sensors, the physical connection between the sensor and the interrogation unit is also prone to corrosion and fracture. In addition, wireless monitoring of strains in the absence of a clear line of sight and/or physical connection to the structure of interest is impossible using conventional resistive or capacitive strain gauges. Conventional strain gauges often have active elements that deform when a load is applied. The performance of these strain sensors tend to deteriorate/drift over time since the fatigue life and mechanical properties of the metallic element determines the ultimate performance.

Recently, wireless sensors have been the subject of tremendous interest. U.S. Patent Application Publication No. 2007/0186677 A1, incorporated by reference herein in its entirety, discloses a non-contact radio-frequency (RF) strain sensor that uses a planar LC (inductor-capacitor combination) circuit element for detecting the resonant frequency change caused by structural deformation proportional to the applied stress. However, this strain sensor contains metallic sensing elements that physically deform on application of the load. The long-term performance of these strain gauges again depends on the fatigue life of the metallic sensing elements, which can typically undergo only a few thousands to tens of thousands of cycles before failure or deterioration in performance. Unfortunately, strain sensors with deformable metallic sensing elements may fail too soon to be suitable for long-term sensing applications, such as monitoring bridges, towers, aircraft components, and the like. In addition, premature failure of deformable metallic sensing elements may not be distinguishable from failure of the structure being monitored.

SUMMARY OF THE INVENTION

Embodiments of the present invention include multi-layer strain sensors, methods of sensing strain, and methods of making multi-layer strain sensors. Example strain sensors include first and second sensing layers formed on first and second rigid substrates, respectively. The sensing layers are separated by an insulating interlayer, which can a flexible elastomer or other suitable material, including air. The sensing layers are coupled together electromagnetically (i.e., capacitively and/or inductively) to form a structure that resonates at a resonance frequency that depends on the relative displacement between the first and second sensing layers. Transmitting a radio frequency (RF) signal toward the sensor produces transmitted and reflected RF signals that each show a peak at the resonance frequency. Moving the first sensing layer with respect to the second sensing layer causes the resonance frequency to shift, causing the peak in the transmitted and reflected RF signals to shift.

Strain sensors of the invention typically have much longer fatigue lives than conventional sensors because the rigid substrates employed in the invention inhibit deformation of the sensing elements during application of a tensile or compressive load to the sensor. Instead, tensile and compressive loads cause the to interlayer to deform. Unlike the sensing layers, which are typically metallic, the interlayer can be made of an elastomer or other insulating material capable of undergoing millions of deformation cycles before failure. Some sensors may even have air interlayers. As a result, the sensors disclosed herein are more suitable for measuring stress and strain in bridges, buildings, aircraft, etc. than conventional strain sensors.

BRIEF DESCRIPTION OF THE DRAWINGS

The claimed concepts will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 3A-3D show plan views of sensing elements suitable for use in upper and lower sensing layers.

DETAILED DESCRIPTION OF THE INVENTION

A description of example embodiments of the invention is as follows.

A multi-layer strain sensor of the invention includes passive RF-responsive antennas, or sensing elements, that are mounted on rigid (i.e., stiff and inflexible) substrates. Displacement of the sensing elements shifts the sensor's resonance frequency by an amount proportional to the applied strain. The rigid substrates prevent the sensing elements from deforming under the applied strain, making it possible for the sensor to undergo millions of measurement cycles before failure. As a result, the strain sensor is eminently suitable for monitoring strain in bridges, buildings, aircraft, and other structures. In some cases, the sensor make be formed using the structure itself. For example, the sensing elements can be printed on opposing surfaces of the structure under test, with an air or elastomer interlayer separating the sensing elements. Strain on the structure under test causes one or both of the surfaces to move (without deforming the sensing elements), resulting in a measurable change in the resonance frequency of the circuit formed by the sensing elements.

Figure 1A:
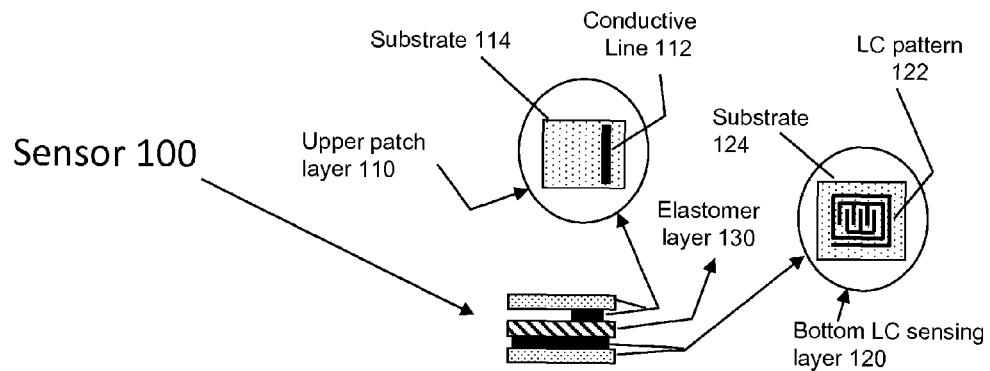
FIG. 1A is a schematic diagram of a multi-layer strain sensor of the invention.

FIG. 1A shows an example of an inductively coupled strain sensor 100 that can detect structural deformation by relative displacement between sensing elements. Strain sensor 100 includes an upper sensing layer 110, also known as an upper patch layer 110; an insulating interlayer 130 made of polyethylene terephthalate (PET), an elastomer, such as silicone fluoropolymer, and a bottom sensing layer 120. Upper sensing layer 110 includes a conductive line 112 and a rigid substrate 114; similarly, the lower sensing layer 120 includes an LC pattern 122 and a rigid substrate 124. Rigid substrates 114 and 124 can be made of glass, ceramics, thermoset Bakelite, composite materials, wood, cement, concrete, or any other suitably rigid material.

Sensing layers 110 and 120 include metallic sensing elements (i.e., conductive line 112 and LC pattern 122) that are electromagnetically coupled together to form an inductor/capacitor (LC) circuit that resonates at radio frequencies, i.e., from a few kilohertz to about 300 GHz. In addition, each sensing element may be RF-responsive by itself. The RF resonant frequency ($f_r$) of strain sensor 100 is given by $$f_r = \frac{1}{2\pi\sqrt{LC}}$$

where L is the inductance and C is capacitance of a resonant circuit formed by sensing elements 112 and 122. Movement of upper sensing element 112 with respect to lower sensing element 122 changes the inductance (L) and/or capacitance (C) of the resonant circuit, which affects the value of the resonant frequency according to the above equation. Changes in resonant frequency can be monitored by interrogating the circuit with a wireless radio-frequency (RF) signal and measuring the reflected or transmitted signal from the sensor, as described below with respect to FIG. 7.

Figure 1B:
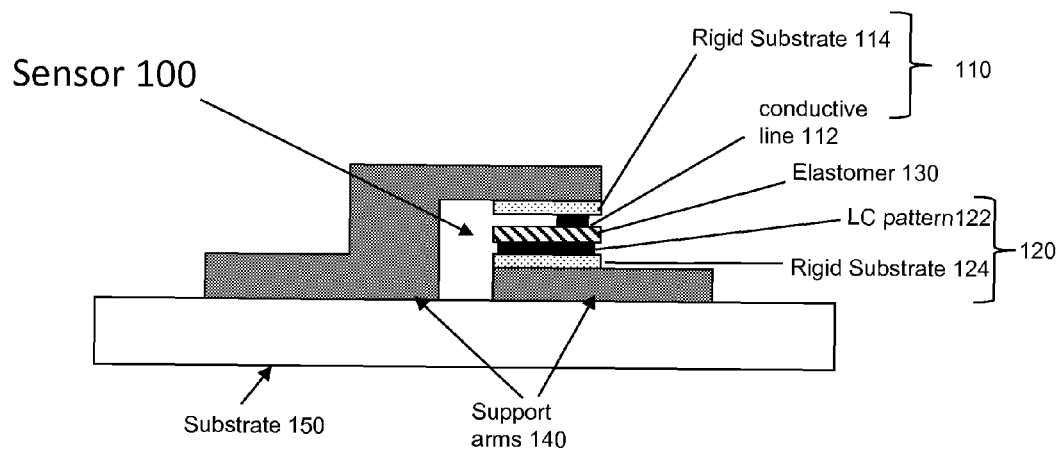
FIG. 1B is a schematic diagram of the multi-layer strain sensor of FIG. 1A attached to a test sample.

FIG. 1B shows sensor 100 of FIG. 1A mounted with support arms 140 on a test substrate 150, which can be subject to a tensile or compressive load. (Alternatively, lower sensing layer 120 of sensor 100 can be mounted directly to test substrate 150, or the strain can be applied directly to rigid substrates 110 and 120.) Compressing or stretching test substrate 150 causes upper sensing layer 110 to move with respect to lower sensing layer 120 by an amount proportional to the applied strain. (Applying a strain to sensor 100 causes interlayer 130 to deform, allowing sensing elements 112 and 122 to move without being deformed.) This movement shifts the resonance frequency by an amount proportional to the change in inductance and/or capacitance, which is proportional to the amount of movement. Interrogating sensor 100 with a swept RF signal yields a reflected signal with a resonant absorption peak whose center frequency shifts as a function of the magnitude of the applied strain.

Applying too much strain to test substrate 150 may cause test substrate 150 to crack and fail. If the crack runs through one or both of sensing layers 110 and 120, the crack will affect the resonance characteristics of sensor 100. In some cases, the resonance frequency of sensor 100 will shift outside the bandwidth or disappear of the chirped RF signal used to interrogate sensor 100, leading to the absence of a resonant peak in the reflected signal. This absence can be used to indicate the presence of a crack in the test structure.

Figure 2A:
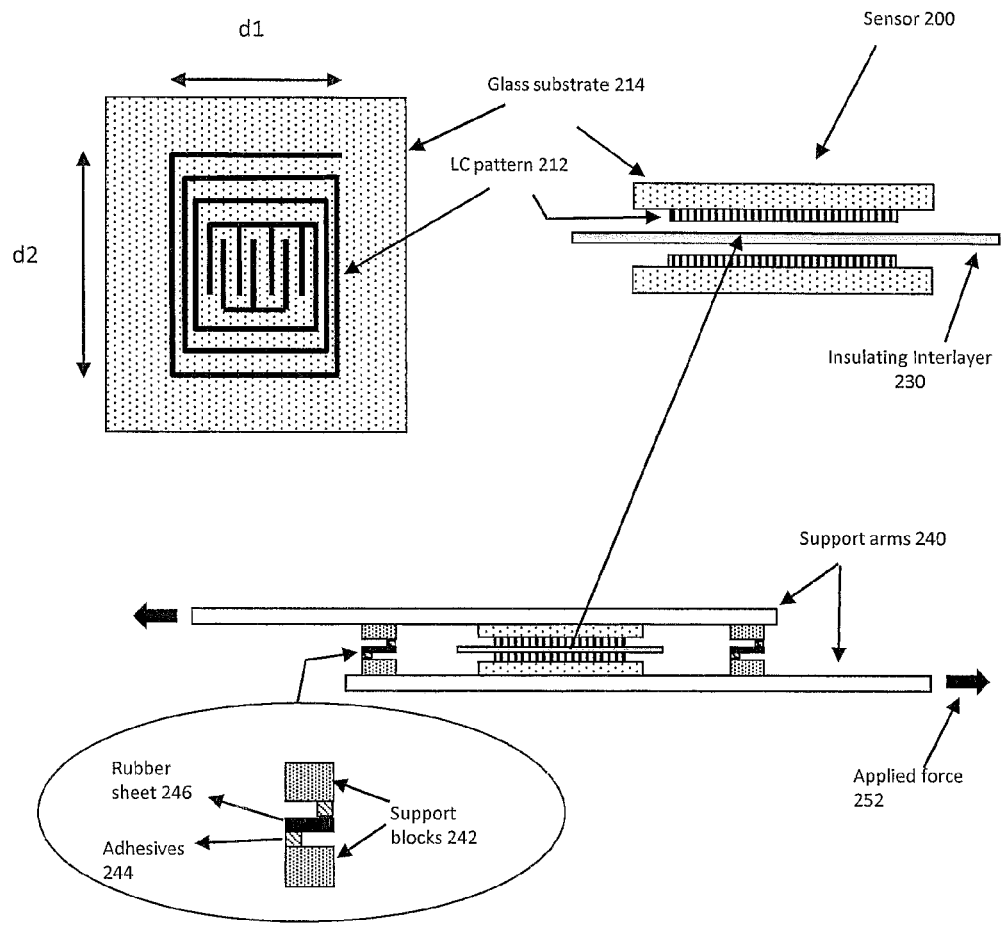
FIGS. 2A and 2B are schematic views of a strain/displacement sensor and a strain/displacement sensor attached to a test sample, respectively.
Figure 2B:
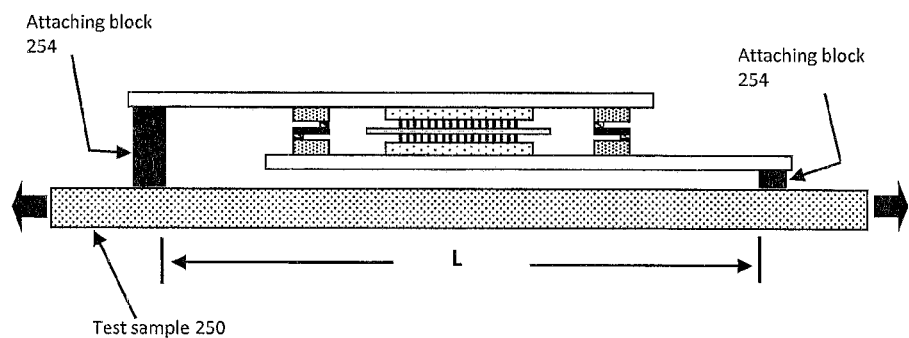

FIGS. 2A and 2B show an alternative strain sensor 200 that includes two sensing elements, or LC patterns 212, that are sandwiched between opposite sides of an insulating layer 230 and two glass substrates 214. Upper and lower LC patterns 212 may be the same or different, depending on the application, and can be printed on the glass substrates 214 as described below. Insulating layer 230, which can be an elastomer, plastic film, air, or other suitable material, prevents abrasions of the printed sensing elements (LC patterns 212) and electrical contact between the sensing layers. Strain sensor 200 is mounted on a test sample 250 (on which the strain has to be determined) with the help of support blocks 242 on support arms 240 that prevent movement of strain sensor 200 in the Z-direction. Rubber sheets 246 are secured between support blocks 242 with adhesives 244.

Applying a force 252 to support arms 240 (e.g., by applying a tensile load to test sample 250) causes insulating interlayer 230 to deform, which in turn causes LC patterns 212 to move with respect to each other. As in sensor 100 of FIG. 1, glass substrates 214 prevent LC patterns 212 from deforming during application of force 252. The displacement between LC patterns 212 causes a shift in the resonance frequency of the sensor proportional to the magnitude of applied force 252 as described above.

One difference between strain sensors 100 and 200 shown in FIGS. 1 and 2, respectively, and other strain gauges is that the sensing elements (e.g., LC patterns 212) do not deform to produce a change in resonance frequency. Instead, the rigid substrates (e.g., glass substrates 214) inhibit or prevent deformation of the sensing elements while the interlayer (e.g., insulating interlayer 230) deforms during application of a tensile or compressive load aligned in the plane of the test sample. The relative movement of the sensing elements with respect to each other creates a response (signal) proportional to the movement (strain) that can be monitored wirelessly, without the requirement for a clear line of sight.

In sensors 100 and 200 shown in FIGS. 1A and 2A, respectively, the individual sensing elements may or may not resonate individually in response to the RF signal. Instead, the combination of the top and bottom sensing elements provides a resonant response that can be monitored remotely. For example, either the first and/or second element can resonate in response to an RF pulse by itself. The presence of the other element (e.g., the second element) changes the net resonance response, possibly by causing a new resonant peak to supplant the resonant peaks of the individual sensing elements. After the strain/displacement sensor has been assembled, the change in the net RF response is proportional to the applied displacement/strain.

FIGS. 3A-3D shows designs of suitable LC circuitry (sensing elements). The sensing elements can include, but are not limited to combinations of the designs shown in FIGS. 3A-3D. Those skilled in the art will appreciate that other designs fall within the scope of the present invention. For example, other suitable inductor-capacitor (LC) combinations may have different combinations of patterns, each of can be varied by changing the size and number of inductor turns, and the size, design, and number of interdigitated fingers of the capacitor. The actual resonant frequency of the sensing device can be varied by variations in the design of the inductor and capacitor, variations in the position of the sensing elements, the area of overlap of the top and bottom conductive layers, and the thickness and dielectric constant of the substrates and the interlayer. Further variations in shape, size, position, and orientation of the sensing elements also fall within the scope of the present invention, as is clear to those skilled in the art. When the substrate (or interlayer) is deformed or when there is relative movement between the sensing elements, the LC coupling of conductive layers changes proportionally to the deformation. In turn, the resonant frequency of strain sensor changes predictably with the deformation.

Example sensing elements, including those illustrated in FIGS. 3A-3D, may be printed conductive elements in the sensing layer. These printed elements may include, but are not limited to combinations of inductors and capacitors (i.e., LC circuits). The inductor(s) and capacitor(s) can be on the same layer or in different layers of the sensing structure. They may be coupled inductively or by a physical electrical connection. The resonant frequency of strain sensor can be varied by the geometric arrangement of upper and bottom conductive elements in the sensor.

Example wireless strain/displacement sensors can be attached to monitor strain on a variety of substrates that include but not limited to plastics, ceramics, and composite materials. Example sensors can also be used to measure displacement or crack enlargement in civil structures (e.g., the sensor can be attached across the crack). In addition, arrays of wireless sensors can be arranged in particular geometric arrangements to detect the direction of displacement and/or the direction of applied stress/compression as described below.

Fabrication of Passive Wireless Sensors

Low-cost fabrication of passive wireless sensors for damage detection is a very promising aspect for structural health monitoring. Currently, the fabrication of sensors relies heavily on conventional photolithography which is an extremely cumbersome and time-consuming process. Recently, a direct-write thermal spray process combined with ultrafast laser micromachining has been described as an alternative approach to the fabrication of sensors for wireless strain monitoring. However, this is a subtractive process that can involve long machining times depending on the thickness of the thermally sprayed coatings. Additive printing techniques like screen and inkjet printing have emerged as attractive alternatives to photolithography due to their simplicity and cost effectiveness.

Screen printing is particularly suited for the deposition of thick film circuits and lends itself to large area, high volume production of patterns on a variety of substrates Line widths of the order of 100 μm can be achieved by screen printing and the thickness of the deposited lines after curing, or sintering is about 10 μm. Here, example wireless LC sensors have been fabricated by screen printing for applications in sensors that can be used for damage detection. Conductive silver inks have been specifically developed for this purpose. These inks can be screen printed and thermally cured to produce the sensing LC circuits. Conductive inks and pastes used in screen printing are generally viscous formulations that are composed of a functional phase (metal particles and flakes) dispersed in an organic medium (binders and solvents). The inks used in this work are cured at temperatures around 150° C. The method of fabrication of the sensing elements may include but no limited to screen printing. The sensing element can be fabricated by any additive process such as inkjet, gravure or any other conventional printing method or subtractive processes such as laser machining or stamping out from continuous sheets of metal.

The wireless sensors disclosed herein can be fabricated by simple techniques such as screen-printing using specially formulated conductive silver inks. Printed silver ink that can be thermally converted into conductive patterns is used to screen-print inductor-interdigital capacitor circuits (LC sensors). These sensors can be printed on any substrate (ceramic, glass or even polymeric films) that needs to be monitored. Further details of conductive inks can be found in U.S. Provisional Application No. 61/200,542, filed on Decemeber 1, 2008, by Nagarajan et al., which is incorporated by reference herein in its entirety.

Interrogation of Passive Wireless Sensors

Figure 4:
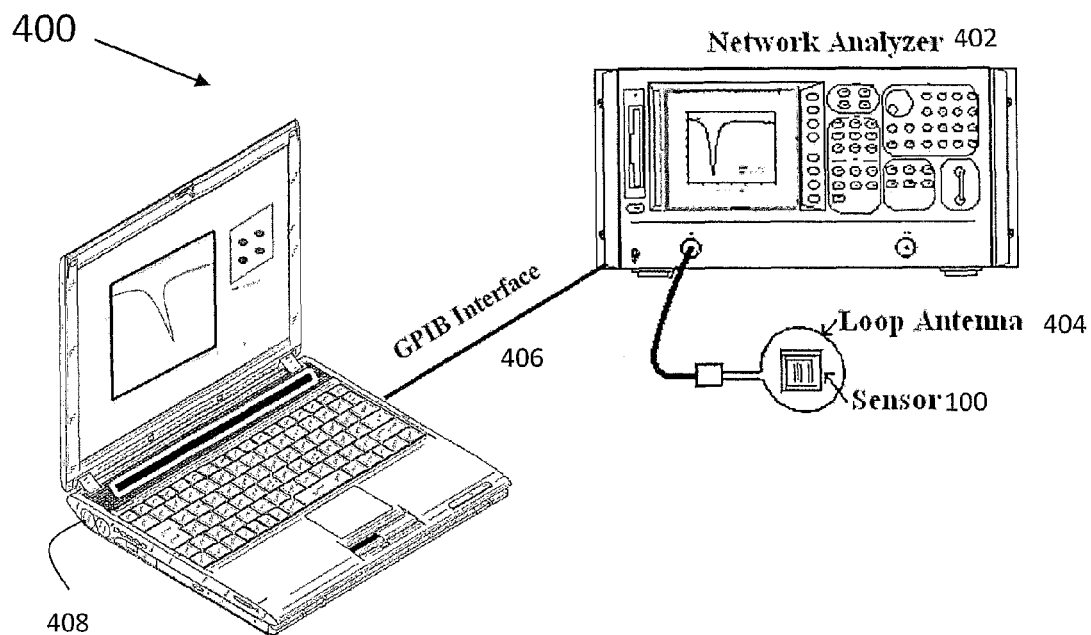
FIG. 4 is diagram of a wireless interrogation system suitable for probing a multi-layer strain sensor.

FIG. 4 is a schematic diagram of a set-up 400 used to wirelessly interrogate sensors such as those shown in FIGS. 1 and 2. As described above, the inductance of the planar spiral inductor (L) and the capacitance of the interdigital capacitor (C) depend on the size and shape of the circuit(s) printed on the sensor. A Hewlett-Packard® 8753C vector network analyzer 402 connected to a loop antenna 404 inductively powers the sensor 100 under test. Making a reflection ($S_{11}$) or transmission ($S_{12}$) measurement with vector network analyzer 402 when sensor 100 enters the interrogation zone of antenna 404 yields a dip at the resonant frequency of LC circuit 100 in the printed sensor. A computer 408 coupled vector network analyzer 402 via a general-purpose instrument bus (GPIB) interface 406 records the measurement for subsequent analysis.

EXEMPLIFICATION

Example 1

Tensile and Compressive Load Measurement

Interdigital capacitance and meander inductance patterns were prepared by screen printing technology as described above to form upper and lower sensing layers. The size of LC pattern (lower layer) is 40 mm×40 mm, and line pattern of upper patch layer 30 mm×3 mm. An adhesive elastomer layer was inserted between the two conductive layers as shown in FIGS. 1A and 2A to create the sensor. The RF response of strain sensors was measured using a vector network analyzer in reflection mode (i.e., an $S_{11}$ measurement). The vector network analyzer transmitted a swept RF signal to the strain sensor, which absorbed the incident RF signal at a resonance whose center frequency varied with the applied load.

Figure 5:
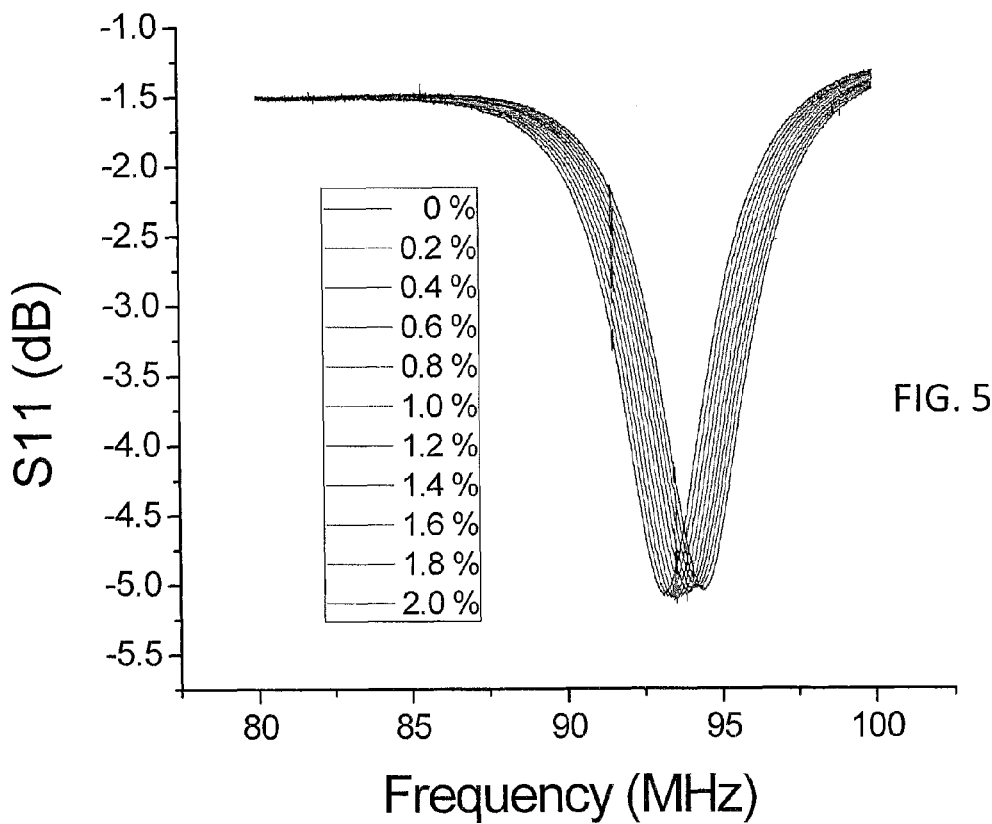
FIG. 5 is a plot of RF response of the multi-layer strain sensor of FIG. 1 under tensile strain.
Figure 6:
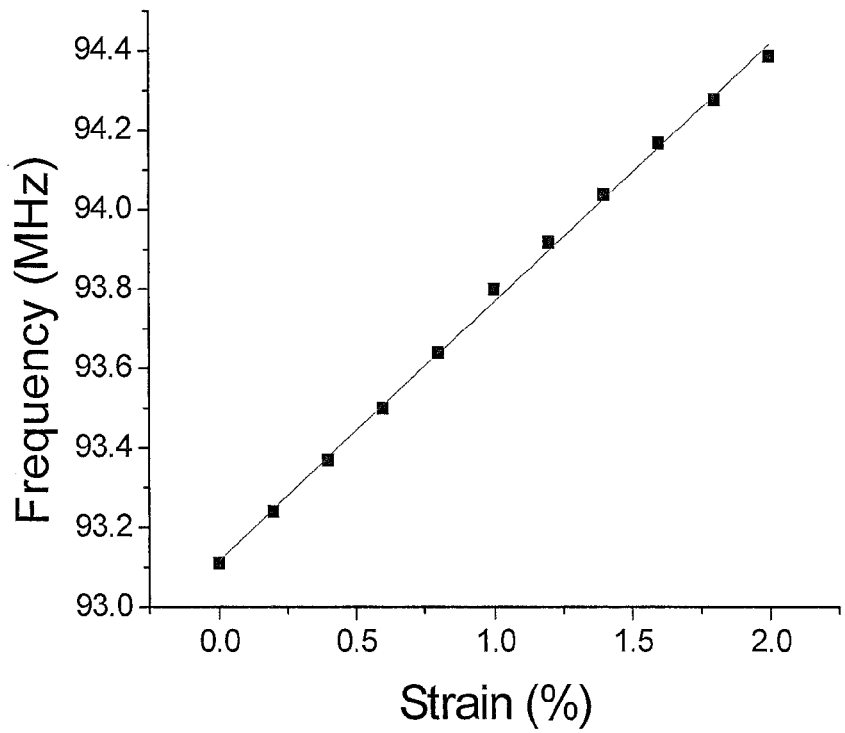
FIG. 6 is a plot of resonant frequency versus percent tensile strain for the sensor of FIG. 1.

FIG. 5 shows a plot of resonant frequency shift caused by a tensile load applied to a strain sensor similar to sensor 100 of FIG. 1. Alternating solid, dashed, and dotted lines show that the absorption resonance (a valley with an amplitude of about −5.0 dB) shifts from about 93.1 MHz to about 94.4 MHz as the applied tensile load increases from 0% to 2.0%. In this case the resonant frequency shift changes linearly with the strain; the shift is on the order of 0.65 MHz/strain %, as shown in FIG. 6.

Figure 7:
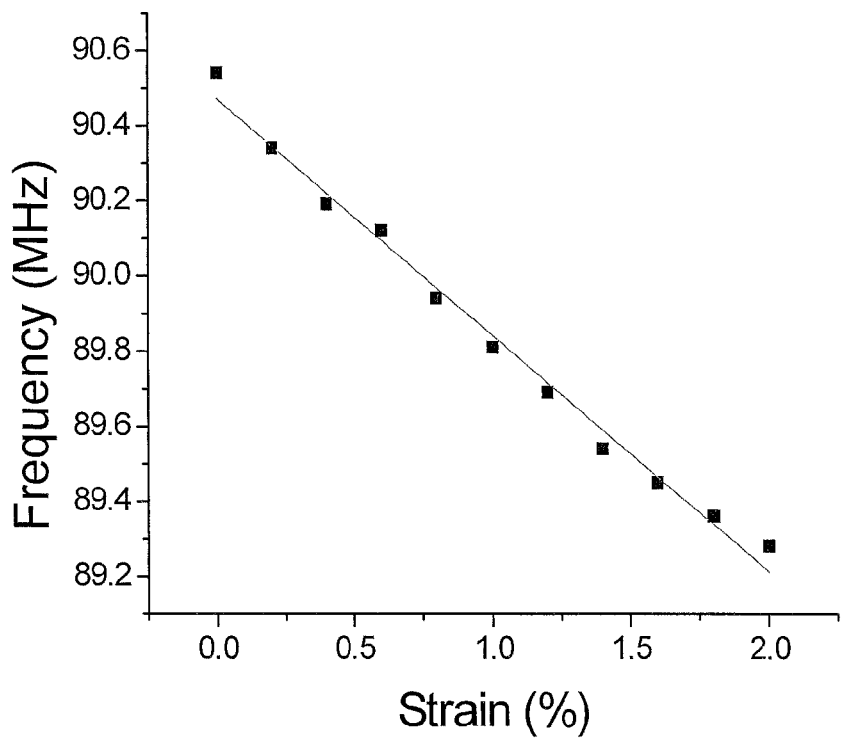
FIG. 7 is a plot of resonant frequency versus percent compressive strain for the sensor of FIG. 1.

FIG. 7 shows a plot of shift in resonant frequency of a strain sensor subjected to compression. Exerting a compressive strain on the sensor causes the center frequency of the absorption resonance to decrease linearly from about 90.5 MHz to about 89.2 MHz. Linearity in tension and compression indicates that the sensor operates relatively free of hysteresis.

Figure 8:
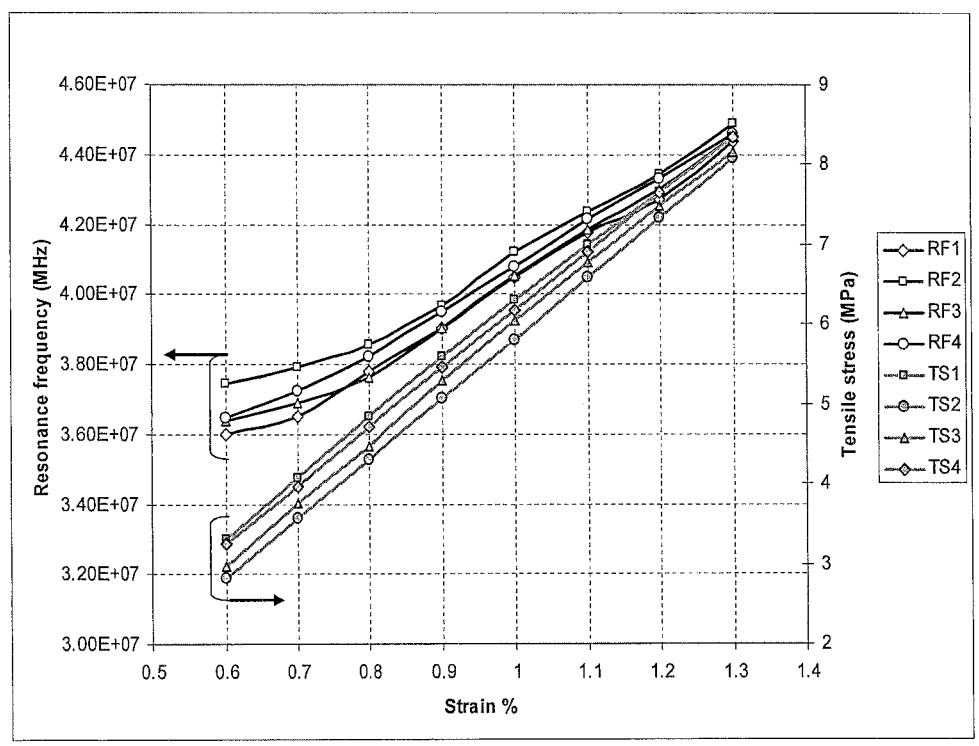
FIG. 8 is a plot of resonance frequency and tensile stress versus percent strain for a multi-layer strain sensor with a polypropylene (PP) sample.

FIG. 8 is a plot of resonance frequency (lines RF1 through RF4) and tensile stress (lines TS1 through TS4) versus percent strain for four separate measurements. Tensile stress varies in a perfectly linear fashion as a function of percent strain. Resonance frequency is slightly nonlinear due to imperfections in the sensor and the material responses of the test substrate and the glue used to secure the sensor to the test substrate.

Those skilled in the art will appreciate that the sensor can also be designed and manufactured to respond nonlinearly to applied strain. In addition, the rate and total amount of shift in resonant frequency can be set depending on the particular application or measurement.

Example 2

Cracked Sensor Interrogation

Detection of cracks and structural damage in the absence of clear line of sight detection is still an important challenge. Fortunately, the RF-based measurements described herein can be applied to the detection of cracks in various structures, including ceramic plates used in body armor. Structural damage, such as a crack on a ceramic plate, leads to a detectable change in the RF response. The ultimate sensitivity of the measured RF response is determined by the size of the metal flake present in the silver ink used for the fabrication of the sensor. The success of these sensors ultimately depends on their performance and ease of manufacture.

Most RF-based inductor-capacitor (LC) resonant sensors reported to date are fabricated using techniques such as photolithography, inkjet printing, thermal spray, and laser micromachining. In this example, a sensor was created using the screen-printing techniques described above. Conductive silver inks were prepared by blending silver powder, flakes and silver acetylacetonate in dry form, followed by the addition of a-terpineol as the solvent and additional mixing. Homogeneous viscous pastes containing about 80% solids were obtained by bead milling the admixed constituents. The cure temperatures of the formulated inks were determined from the thermal decomposition characteristics of the inks. Thermogravimetric analysis was performed on a TA Instruments® Q50 thermogravimetric analyzer. The ink samples were heated in a nitrogen atmosphere at 10° C./minute up to 600° C.

A printed sensor was made with the inductor-interdigital capacitor circuit pattern shown in FIG. 3B by screen-printing ink on ceramic substrates using a 305-mesh monofilament polyester screen and subsequently curing the printed substrate at 140° C. for 15 minutes. The conductive silver inks formulated for screen printing of LC circuits include silver flakes as the predominant functional particles and an organic precursor of silver dispersed in a solvent medium. On heating, evaporation of solvent occurs while the organic precursor undergoes thermal decomposition to form a silver layer. The printed pattern starts becoming electrically conductive at this stage and subsequent sintering, leads to the formation of continuous, highly conductive traces in the desired pattern, e.g., the pattern of FIG. 3B.

Figure 9A:
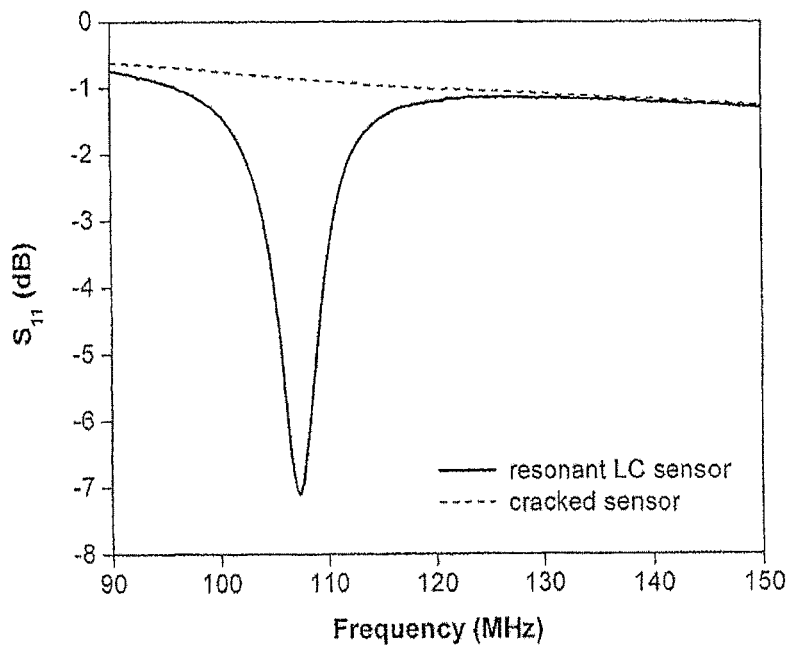
FIG. 9A is a plot of frequency response from a printed LC sensor and a cracked sensor

FIG. 9A shows that a sharp resonance (solid line) appears at 107 MHz when the printed sensor was brought into the interrogation zone of loop antenna 404 shown in FIG. 4. The observed frequency response was very close to the value of the resonance frequency obtained by high frequency structural simulator (HFSS) simulation. The LC resonator in the printed sensor is activated by the oscillating electromagnetic field radiated by loop antenna 404 according to Faraday's Law; this induces an electromotive force (emf) (Vi) in the planar inductor coils of the sensor. The impedance of antenna 404, expressed in terms of the LC parameters, changes due to the back emf (Vf) from the printed sensor. The reflected voltage measured across loop antenna 404 in is given by:

$$s_{11} = -20\log\frac{V_f}{V_i}$$

At resonance, both the induced emf and the back emf across loop antenna 404 reach a maximum which is seen as a sharp dip at the sensor's resonant frequency.

Figure 9B:
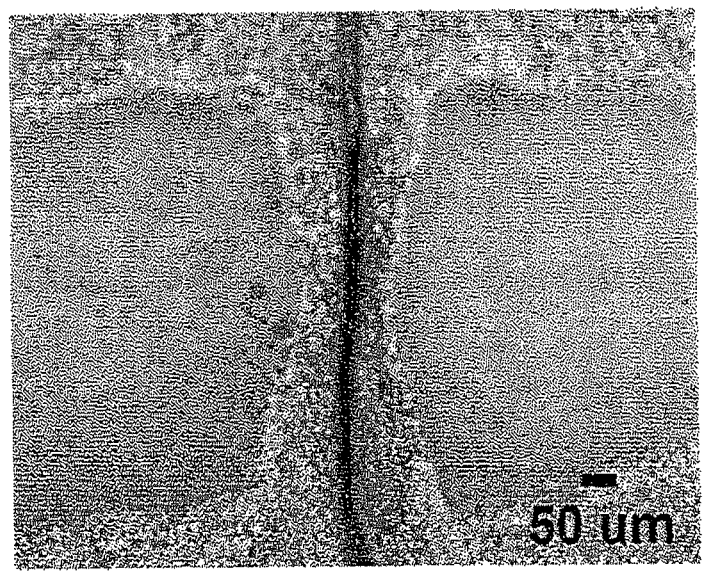
FIG. 9B is an optical micrograph of a microcrack propagating through a printed circuit line.

FIG. 9B shows an optical micrograph of a crack across a silver line that forms one of the conductive traces printed on a particular sensor. A microcrack such as the one shown in FIG. 9B produces a discontinuity in the sensing elements, thus disrupting the LC circuit. This is manifested as a loss of the resonant frequency of the sensor, indicating the presence of a crack in the substrate. The dashed line in FIG. 8 shows that interrogating a cracked sensor with the loop antenna yields a reflection measurement without a resonant frequency dip. Any form of structural damage either leading to the complete disruption of the sensing elements or a change in the circuit parameters leads to a detectable change in the resonant characteristics of the sensor. This methodology of using printed circuits can be extended to the detection of structural damage in large-area structures and components.

Example 3

Passive Wireless Sensor Arrays

Sensors and sensing elements may also be arranged in periodic or aperiodic arrays. In addition, different sensors and sensing elements in the array(s) may be oriented in different directions, depending on the application. Because the individual sensors are displaced from each other and/or oriented in different directions, each sensor measures a projection of the applied displacement along a different basis (set of axes). These measurements can be used to trace the direction of displacement or applied strain by measuring the change in resonant frequency profile of each of the sensors caused by the relative displacement of the sensing element on complementary layers.

Figure 10:
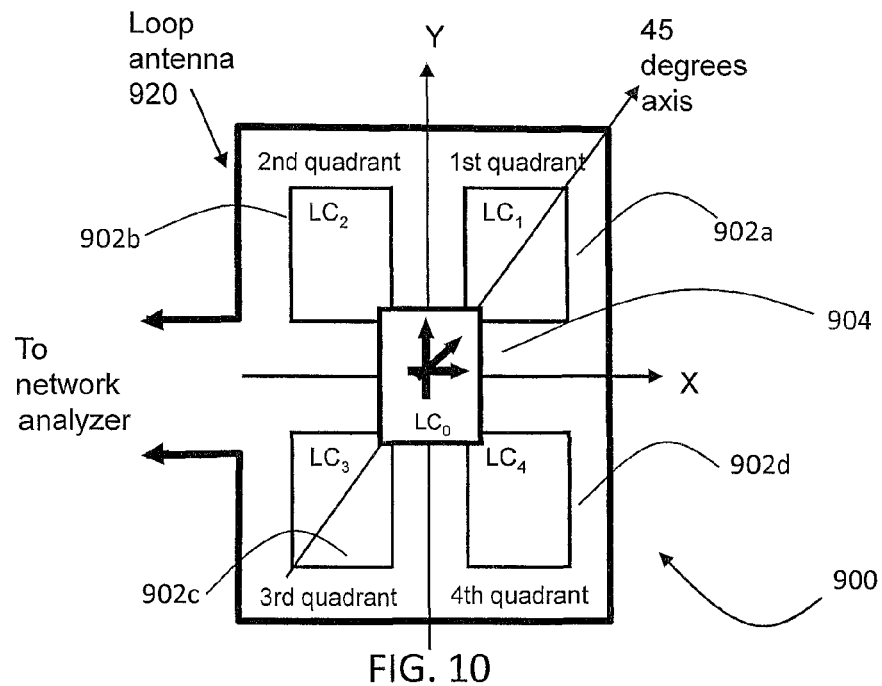
FIG. 10 is a plan view of a directional sensor that includes five of the inductor-capacitor circuits shown in FIG. 7A. Sensor $LC_0$ is disposed above sensors $LC_1$, $LC_2$, $LC_3$, and $LC_4$.

FIG. 10 shows an example sensor 900 with four sensing elements 902a-902d (LC$_1$, LC$_2$, LC$_3$, and LC$_4$) printed on a single surface to formed a single sensing layer. Another sensing element 904 (LC$_0$) was printed on an upper surface to form a complementary sensing layer. The upper sensing element 904 formed pairwise combinations with each of the sensing elements 902a-902d on the lower sensing layer, i.e, 902a with 904, 902b with 904, and so on, that resonated at slightly different nominal center frequencies. Because the resonant frequency of each pairwise combination is different, the sensor can be used to measure the magnitude and direction of an applied strain.

Figure 11:
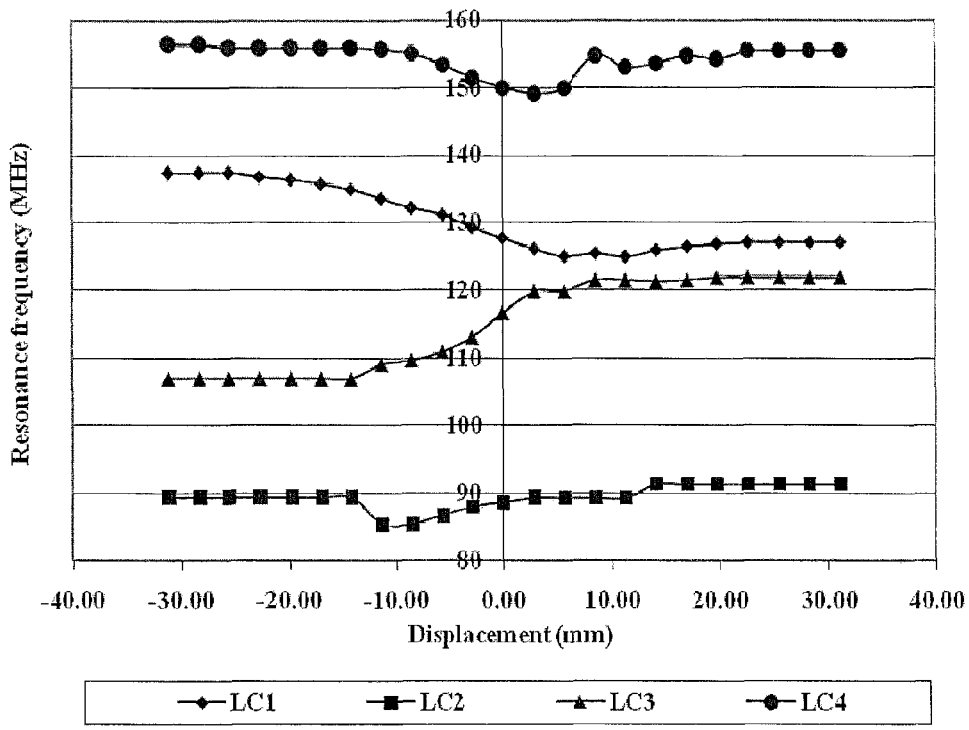
FIG. 11 is a plot of resonance frequency for sensors $LC_1$, $LC_2$, $LC_3$, and $LC_4$ versus displacement of sensor $LC_0$ along the 45° axis shown in FIG. 10.
Figure 12:
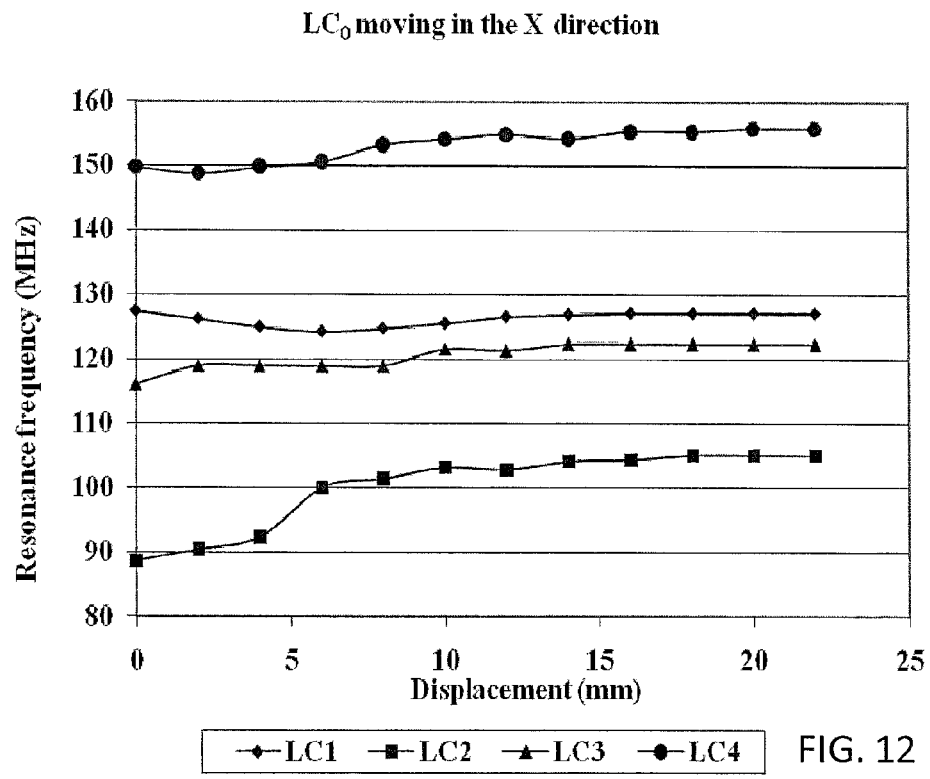
FIG. 12 is a plot of resonance frequency for sensors $LC_1$, $LC_2$, $LC_3$, and $LC_4$ versus displacement of sensor $LC_0$ along the X axis shown in FIG. 10.
Figure 13:
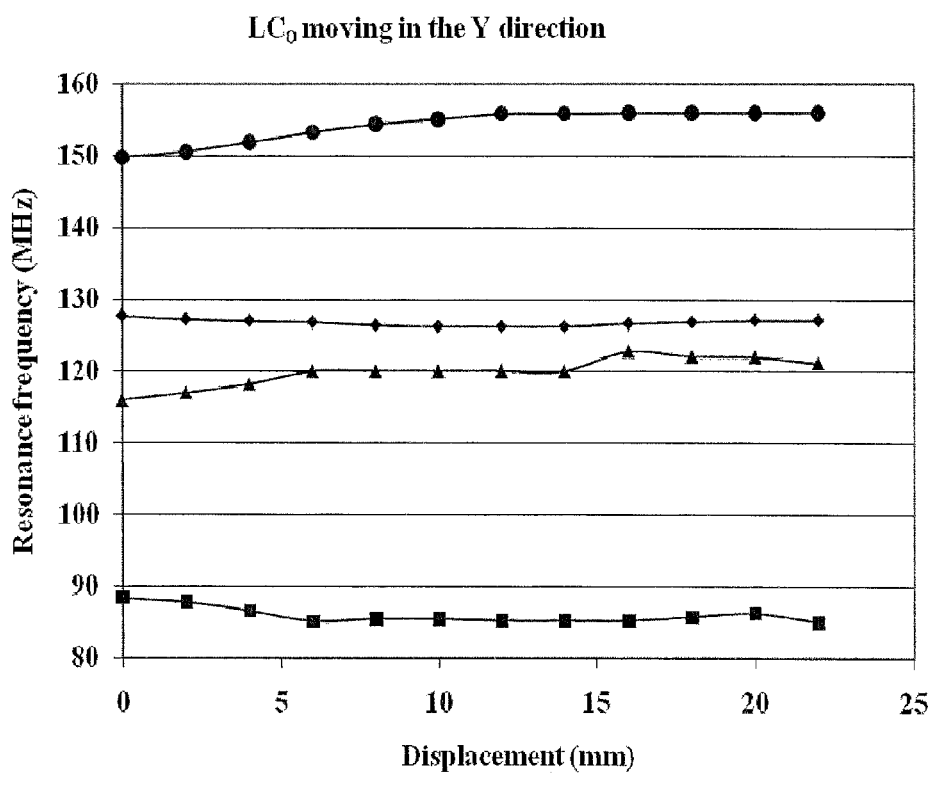
FIG. 13 is a plot of resonance frequency for sensors $LC_1$, $LC_2$, $LC_3$, and $LC_4$ versus displacement of sensor $LC_0$ along the Y axis shown in FIG. 10.

The sensor 900 was interrogated with a loop antenna 920 while being subject to tensile strain along the X, Y, and 45-degree axes shown in FIG. 10, and the change in RF response was measured with vector network analyzer 404 coupled to antenna 400 (FIG. 4). Strain caused the upper sensing element 904 to move with respect to the lower sensing layer, yielding changes in the resonance frequencies of the pairwise combinations as shown in FIGS. 11-13, which are plots of resonance frequency versus displacement along the X, Y, and 45-degree axes. By comparing with the resonant frequency responses of sensing elements, the direction of tensile strain can be traced out in FIGS. 11-13. FIG. 11 shows that a 60 mm displacement along the 45-degree axis caused the center frequencies associated with sensing elements 902a (LC$_1$) and 902c (LC$_3$) to shift down and up, respectively, by about 15 MHz each. Similarly, FIG. 12 shows that a 25 mm displacement along the X axis causes the resonance frequencies associated with sensing elements 902b (LC$_2$) and 902d (LC$_4$) to shift up by about 15 MHz each. The resonance frequencies associated with sensing elements 902a and 902c shift down by about 5 MHz each. FIG. 13 shows similar behavior for strain along the Y axis.

While this invention has been particularly shown and described with references to example embodiments thereof, it will be understood by those skilled in the art that various changes in form and details may be made therein without departing from the scope of the invention encompassed by the appended claims.

What is claimed is:

1. A sensor comprising:
    (a) a first sensing layer including a plurality of first sensing elements on a first rigid substrate;
    (b) a second sensing layer including a second sensing element on a second rigid substrate; and
    (c) an electrically insulating interlayer disposed between the first and second sensing layers,
        wherein the plurality of first sensing elements and the second sensing element are electromagnetically coupled to each other, wherein a resonance frequency of the sensor varies as a function of relative displacement between the first and second sensing layers, and wherein relative movement between the first and second sensing layers causes a change in a plurality of resonance frequencies associated with the plurality of first sensing elements, thereby directing movement of the first sensing layer relative to the second sensing layer in a plane partitioning the first and second sensing layers.

2. The sensor of claim 1, wherein at least one of the first and second sensing elements includes an electrically conductive material.

3. The sensor of claim 1, wherein at least one of the first and second sensing layers is formed by an additive technique.

4. The sensor of claim 3, wherein the additive technique includes screen-printing.

5. The sensor of claim 1, wherein at least one of the first and second sensing layers is formed by a subtractive technique.

6. The sensor of claim 5, wherein the subtractive technique includes laser cutting.

7. The sensor of claim 1, wherein the first and second rigid substrates inhibit deformation of the first and second sensing elements, respectively, during relative motion of the first sensing layer with respect to the second sensing layer.

8. The sensor of claim 1, wherein at least one of the first and second rigid substrates includes at least one member of a group consisting of glass, ceramics, thermoset Bakelite, composite materials, wood, cement, and concrete.

9. The sensor of claim 1, wherein the interlayer is an adhesive interlayer.

10. The sensor of claim 9, wherein the adhesive interlayer includes at least one member of a group consisting of thermoplastics, elastomers, and curable adhesives.

11. The sensor of claim 1, wherein the interlayer includes air.

12. The sensor of claim 1, wherein the interlayer has a fatigue life of at least one million measurement cycles.

13. A method of sensing strain, the method comprising the steps of:
    (a) transmitting a radio frequency (RF) signal toward a sensor to produce a transmitted or reflected RF signal, wherein the sensor comprises a first sensing layer including a plurality of first sensing elements on a first rigid substrate, a second sensing layer including a second sensing element on a second substrate, and an insulating interlayer disposed between the first and second sensing layers, wherein the plurality of first sensing elements are electromagnetically coupled to the second sensing element, and wherein relative movement between the first and second sensing layers causes a change in a plurality of resonance frequencies associated with the plurality of first sending elements, thereby detecting direction of movement of the first sensing layer relative to the second sensing layer in a plane partitioning the first and second sensing layers; and
    (b) detecting the transmitted or reflected RF signal, wherein a center frequency of a resonant peak in the reflected or transmitted RF signal indicates strain exerted on the sensor.

14. The method of claim 13, wherein the RF signal is transmitted wirelessly toward the sensor.

15. The method of claim 13, wherein the RF signal is transmitted along a path other than a line-of-sight path.

16. The method of claim 13, wherein at least one of the first and second sensing layers includes an electrically conductive material.

17. The method of claim 13, wherein the first and second rigid substrates inhibit deformation of the first and second sensing layers, respectively, during movement of the first sensing layer with respect to the second sensing layer.

18. The method of claim 13, wherein the interlayer deforms during movement of the first sensing layer with respect to the second sensing layer.

19. The method of claim 13, wherein the interlayer includes air.

20. The method of claim 13, wherein an absence of the resonant peak indicates formation of a crack in at least one of the upper and lower sensing elements.

21. A method of making a sensor, the method comprising the steps of:
    (a) forming a first sensing layer including a plurality of first sensing elements on a first rigid substrate;

(b) forming a second sensing layer including a second sensing element on a second rigid substrate; and (c) disposing an electrically insulating interlayer between the first and second sensing layers, wherein the plurality of first sensing elements and the second sensing element are electromagnetically coupled to each other, wherein the first and second rigid substrates inhibit deformation of the first and second sensing layers, and wherein relative movement between the first and second sensing layers causes a change in at least a plurality of resonance frequencies associated with the plurality of first sensing elements, thereby detecting direction of movement of the first sensing layer relative to the second sensing layer in a plane partitioning the first and second sensing layers.

22. The method of claim 21, wherein forming at least one of the first and second sensing layers includes the step of additive application of the respective sensing element to the respective rigid substrate.

23. The method of claim 21, wherein forming the first sensing layer includes depositing an electrically conductive pattern on the first rigid substrate.

24. The method of claim 21, wherein forming at least one of the first and second sensing layers includes the step of subtracting material from electrically conductive material.

25. The method of claim 21, wherein forming the first sensing layer includes laser cutting a metallic element.

26. The method of claim 21, wherein disposing the interlayer includes adhering the interlayer to at least one of the first and second sensing layers.

* * * * *